United States Patent [19]

Calabro et al.

[11] Patent Number: 4,775,537

[45] Date of Patent: Oct. 4, 1988

[54] SEQUENTIALLY FLAVORED CHEWING GUM COMPOSITION

[75] Inventors: Frank P. Calabro, Budd Lake; Michael Glass, Fairlawn; Mamoun M. Hussein, Mountain Lakes; Carolina Militescu, Flanders, all of N.J.

[73] Assignee: Warner-Lambert Company, Morris Plains, N.J.

[21] Appl. No.: 45,101

[22] Filed: Apr. 30, 1987

[51] Int. Cl.$^4$ .............................................. A23G 3/30
[52] U.S. Cl. ......................................... 426/3; 426/5; 426/533; 426/650
[58] Field of Search ....................... 426/3, 5, 651, 534, 426/533

[56] References Cited

U.S. PATENT DOCUMENTS

| | | | |
|---|---|---|---|
| 3,205,075 | 9/1965 | Heggie et al. | 426/5 |
| 3,795,744 | 3/1974 | Ogawa et al. | 426/3 |
| 3,857,964 | 12/1974 | Yolles | 426/3 |
| 3,903,305 | 9/1975 | Bahoshy et al. | 426/3 |
| 3,920,849 | 10/1974 | Marmo et al. | |
| 4,157,401 | 6/1979 | Stroz et al. | 426/3 |
| 4,208,431 | 6/1980 | Friello et al. | |
| 4,217,368 | 8/1980 | Witzel et al. | |
| 4,259,355 | 3/1981 | Marmo et al. | 426/5 |
| 4,485,118 | 11/1984 | Carroll et al. | 426/5 |
| 4,533,556 | 8/1985 | Piccollo et al. | 426/3 |
| 4,588,592 | 5/1986 | Elias | 426/5 |
| 4,590,075 | 5/1986 | Wei et al. | |
| 4,604,288 | 8/1986 | Glass et al. | |

Primary Examiner—Jeanette Hunter
Attorney, Agent, or Firm—Henry C. Jeanette; Gary M. Nath

[57] ABSTRACT

A sequentially flavored chewing gum composition is disclosed. The chewing gum composition comprises: (A) gum base; (B) one or more non-confined water soluble flavoring agents; (C) one or more non-confined oil soluble flavoring agents; and (D) optionally, conventional chewing gum additives. The water soluble flavoring agents, upon chewing the gum composition, release first to provide distinct flavor perceptions. The oil soluble flavoring agents release subsequent to the release of the water soluble flavoring agents to provide flavor perceptions distinct from the flavor perceptions of the water soluble flavoring agents.

Also disclosed is a sequentially flavored chewing gum composition. The chewing gum composition comprises: (A) gum base; (B) two or more non-confined oil soluble flavoring agents; and (C) optionally, conventional chewing gum additives.

Further disclosed is a process for making sequentially flavored chewing gum compositions.

25 Claims, No Drawings

SEQUENTIALLY FLAVORED CHEWING GUM COMPOSITION

FIELD

This invention relates to a chewing gum composition having sequentially releasable flavoring agents.

BACKGROUND

Most chewing gums, including bubble gums, contain a generally water-insoluble gum base, water-soluble sweeteners that are either natural or artificial, and a flavoring that may be added in a variety of forms. Also, the gum may contain various additives such as plasticizers, softeners and bulking agents to improve consistency and to generally enhance the chewing experience.

It has become desirable to develop chewing gums and bubble gums containing plural diverse flavor components, to offer a flavor variation and overall flavor extension during the chew. Several efforts have been made to prepare chewing gums having diverse flavors by the encapsulation or entrapment of at least one of the flavors or flavoring agents. Such products have generally been unable to offer desirable flavor intensity of the respective flavor components, and accurate transition between the respective flavors.

For example, U.S. Pat. No. 3,205,075 is directed to chewing gums containing edible materials such as nonpareil seeds. The seeds may be flavored by coating them with a thin layer of flavoring followed by the addition of another sugar layer followed by the addition of a further flavoring layer, etc. The procedure is continued until the seeds are of the desired size. According to this patent, slab chewing gums may be prepared having different flavors while preventing admixture of the flavors thereby preserving each flavor separate from the other until such time as the gum is chewed. For example, one flavor may be added to the gum base while another flavor may be incorporated into the seeds. In addition a blend of seeds containing different flavors may be dispersed throughout the gum base.

U.S. Pat. No. 3,795,744 to Ogawa et al purports to offer a chewing gum having flavor variability achieved by forming a plurality of flavor composites prepared in granular form with certain high molecular weight compounds, both water-insoluble and water-soluble, which may thereafter be incorporated into a chewing gum base. Ogawa et al purport to achieve sequential flavor delivery by the modulation of the coating applied to the respective flavor particles. The flavors in Ogawa et al are added at the same stage of gum processing.

U.S. Pat. No. 3,826,847 also to Ogawa et al is cumulative in its disclosure with the earlier mentioned patent, as it likewise relates to the encapsulation of flavoring with high molecular weight materials such as those mentioned earlier. In other respects, however, Ogawa et al utilizes the same preparation and offers the same possibility for products so prepared.

U.S. Pat. No. 3,920,849 to Marmo et al addresses the concept of extended flavor release and offers a full discussion of the prior art on this subject. The patent directs itself to the preparation of separate flavor components identified as "fixed" (encapsulated) and "unfixed", which are mixed with a suspension agent prior to their addition to a chewing gum base. The patentees contend that this method of preparation and addition to the chewing gum offers improved flavor intensity and uniform flavor transmission in the instance where plural diverse flavors are utilized. The patentees specifically employ a non-confined hydrophobic flavor oil and a "fixed" hydrolytically releasable flavor oil in combination with a solid suspending agent, as their flavor system. The preparation of the flavors is such that the resulting system is added simultaneously to the gum base.

In similar fashion, U.S. Pat. No. 4,001,438 also to Marmo et al discloses a flavor composition utilizing a non-confined flavor oil in combination with a flavor oil physically entrapped within solid particles, and a suspending agent combined therewith. All of these ingredients are premixed and thereafter simultaneously added to the product to be flavored. It is significant that the flavor system of this patent is predicated upon an intimate admixture between the non-confined flavor oil and the entrapped flavor oil.

U.S. Pat. No. 4,259,355, also to Marmo et al is effectively cumulative upon the earlier issued Marmo et al patents, in that it teaches the preliminary combination or admixture of a non-confined flavor oil and entrapped flavor oil and a suitable suspending agent. In the '355 patent, the respective flavors are prepared with a cellulosic suspending agent and are thereafter mixed, and the resulting flavor composite is thereafter added to the chewing gum, tobacco etc.

U.S. Pat. No. 4,485,118 is directed to a gum composition and method of making the same. The composition contains a sequentially releaseable plural flavor system comprised of different flavors. One of the flavors is encapsulated within a water-insoluble coating. A separate liquid flavor is introduced individually and is available for immediate release. The liquid flavor component is prepared from a flavor other than that of the encapsulated flavor component and other flavor components are separately added to the gum base. The patent states that these gum compositions offer improved flavor intensity and clarity of flavor transition, as well as overall extension of the flavor sensation.

U.S. Pat. No. 4,590,075 is directed to a flavor/sweetener delivery system and to chewing gum composition prepared therefrom. The delivery system comprises flavor and/or sweetening agents encapsulated in a matrix. The delivery system delivers the flavor and/or sweetener very slowly over a long period of time when chewed in a chewing gum composition. The chewing gum compositions containing the delivery system may contain other flavors and/or sweeteners which may be added in a traditional conventional manner during processing and which are relased quickly and immediately upon chewing, to give an initial burst of flavor.

U.S. Pat. No. 4,604,288 is directed to a method of preparing a chewing gum composition. In the method a premixture of lecithin and a liquid flavor is made and then added to a chewing gum composition. It is disclosed that the addition of the liquid flavor/lecithin premix mitigates and substantially reduces bitterness or harsh off-notes common with certain flavors. According to this patent, additional flavoring agents may be employed separately and in addition to the flavoring in the premix.

British Pat. No. 1,327,761 to Smith et al discloses a compound encapsulation of a flavoring, wherein a first water-soluble encapsulant is applied to the flavor and a second water-insoluble encapsulant is thereafter applied. The water-insoluble encapsulant is critically identified as having a melting point substantially below that of the water-soluble encapsulating material, to provide the desired qualities of the product. There is no disclosure in the British Patent, however, of the preparation of gum compositions having plural flavors offering time controlled variant flavor release characteristics.

The art has simply failed to recognize that it is possible to make a chewing gum composition having sequentially releasable favoring aents by the sole use of non-confined flavoring agents having different solubilities and hence different rates of release. Such a composition would be a welcome contribution to the art and such a contribution is provided by this invention.

SUMMARY OF THE INVENTION

This invention provides a chewing gum composition having sequentially releaseable flavoring agents. The sequential release is provided by using non-confined flavoring agents having different solubilities and therefore different rates of release from a chewing gum composition when the composition is chewed. By the term "non-confined" it is meant that the flavoring agents are not encapsulated by or entrapped in any material such that their release would depend on the breaking or crushing of the capsule of encapsulating material or on the alteration of the physical state of the encapsulating or entrapping material, e.g., swelling or dissolution.

DETAILED DESCRIPTION OF THE INVENTION

This invention provides a sequentially flavored chewing gum composition comprising:

(A) gum base in an amount sufficient to form a chewing gum composition;

(B) one or more non-confined water soluble flavoring agents in an amount sufficient to give the flavor perception of said water soluble flavoring agents, said water soluble flavoring agents having the same or different solubilities and the same or different rates of release;

(C) one or more non-confined oil soluble flavoring agents in an amount sufficient to impart the flavor perception of said oil soluble flavoring agents, said oil soluble flavoring agents having the same or different solubilities and the same or different rates of release; and (D) optionally, effective amounts of conventional chewing gum additives; wherein said water soluble flavoring agents, upon chewing said composition, release first to provide distinct flavor perceptions, and said oil soluble flavoring agents release subsequent to the release of said water soluble flavoring agents to provide flavor perceptions distinct from said water soluble flavoring agents' flavor perceptions.

This invention also provides a process for making a chewing gum composition comprising:

mixing a gum base in an amount sufficient to form a chewing gum composition, with one or more non-confined water soluble flavoring agents in an amount sufficient to give the flavor perception of said water soluble flavoring agents, said water soluble flavoring agents having the same or different solubilities and the same or different rates of release, with one or more non-confined oil soluble flavoring agents in an amount sufficient to give the flavor perception of said oil soluble flavoring agents, said oil soluble flavoring agents having the same or different solubilities and the same or different rates of release, with optionally, effective amounts of conventional chewing gum additives; wherein said gum base and flavoring agents are mixed together at a temperature below the volatilization temperature of said flavoring agents, thereby forming a chewing gum composition having sequentially releasable flavoring agents, wherein said water soluble flavoring agents, upon chewing said composition, release first to provide distinct flavor perceptions, and wherein said oil soluble flavoring agents release subsequent to the release of said water soluble flavoring agents to provide flavor perceptions distinct from said water soluble flavoring agents' flavor perception.

This invention additionally provides a sequentially flavored chewing gum composition comprising:

(A) gum base in an amount sufficient to form a chewing gum composition;

(B) effective amounts of two or more non-confined oil soluble flavoring agents wherein at least two flavoring agents have different solubilities and different rates of release; and (C) optionally, effective amounts of conventional chewing gum additives; wherein said flavoring agents release sequentially to provide distinct flavor perceptions.

Also provided by this invention is a process for making a chewing gum composition comprising:

mixing a gum base in an amount sufficient to form a chewing gum composition, with effective amounts of two or more non-confined oil soluble flavoring agents wherein at least two flavoring agents have different solubilities and different rates of release, with optionally, effective amounts of conventional chewing gum additives; wherein said gum base and flavoring agents are mixed together at a temperature below the volatilization temperature of said flavoring agents, thereby forming a chewing gum composition having sequentially releasable flavoring agents providing distinct flavor perception.

The sequential flavoring agent release of the claimed invention is obtained by using non-confined flavoring agents of differing solubilities and therefore differing rates of release into the mouth of a chewer when the compositions are chewed. More particularly, in one embodiment, water soluble flavoring agents are used to provide a distinct up front (i.e., quick) flavor perception and oil soluble flavoring agents are used to provide a subsequent distinct flavor perception. The oil soluble flavoring agents, during chewing, are released after the water soluble flavoring agents are released. In another embodiment the sequential flavoring agent release is obtained using only oil soluble flavoring agents. The oil soluble flavoring agents having different solubilities and rates of release provide distinct flavor perception in a sequential manner. In general, by sequential release it is meant that there is distinct flavor perceptions followed by another distinct flavor perception. Thus, for example, the release of the oil soluble flavoring agents may occur about 5 seconds to about 3 minutes after the release of the water soluble flavoring agents with about 15 seconds to about 45 seconds being preferred and about 20 seconds to about 45 seconds being most preferred. Similar time release patterns may be obtained where only oil soluble flavoring agents are used.

Of the non-confined water soluble flavoring agents one flavoring agent can be used or more than one flavoring agent can be used. When more than one water soluble flavoring agent is used, the agent may be the same flavoring agent but with differing solubilities or different flavoring agents may be used having the same or different solubilities. When different flavoring agents are used and they have the same or substantially the same solubilities then a flavor blend or combination may be perceived by the chewer. When the flavoring agents have different solubilities then a sequential release of flavoring agents would occur within the group of water soluble flavoring agents, with this release pattern still occurring before the release of the oil soluble flavoring agents.

Similarly, in the embodiment where water soluble flavoring agents are used, one non-confined oil soluble flavoring agent can be used or more than one can be used. When more than one oil soluble flavoring agent is used, the agent may be the same flavoring agent but with differing solubilities or different flavoring agents may be used having the same or different solubilities. When different flavoring agents are used and they have the same or substantially the same solubilities, then a flavor blend or combination may be perceived by the chewer. When the flavoring agents have different solubilities then a sequential release of flavoring agents would occur within the group of oil soluble flavoring agents, with this release pattern occurring after the release of the water soluble flavoring agents.

In the embodiment where two or more oil soluble flavoring agents are used, but no water soluble flavoring agents are used, the sequential flavor release is obtained in a manner similar to that already described above for the oil soluble flavoring agents. Non-confined oil soluble flavoring agents having different solubilities and different rates of release are used to provide sequential release. Different oil soluble flavoring agents having the same or substantially the same rates of release and solubilities can be used provided there is at least two oil soluble flavoring agents having different rates. Within the pattern of sequential release, using different oil soluble flavoring agents having the same or substantially the same rates of release and solubilities may provide blends or combinations of flavor perceptions.

Those skilled in the art will appreciate that in the selection of the water soluble and oil soluble flavoring agents, those agents will be used which are compatible with each other and which therefore will not adversely react with one another. Preferably only one water soluble flavoring agent is used and only one oil soluble flavoring agent is used in the embodiment using these flavoring agents. In the embodiment using only oil soluble flavoring agents, preferably two different oil soluble flavoring agents are used. Those skilled in the art will also appreciate that reference to the solubility of the flavoring agents is a way of making reference to the release rates and sequence of release of the flavoring agents into the mouth of the chewer when the chewing gum compositions are chewed. Thus, a more soluble flavoring agent, in comparison to a less soluble flavoring agent, will release before the less soluble flavoring agent releases.

The non-confined water soluble and the non-confined oil soluble flavoring agents are each used in an amount sufficient to give the flavor perception of the flavoring agents to a chewer when the chewing gum composition is chewed. The amount of flavoring agent employed for such purposes is normally a matter of preference subject to such factors as flavor type, the form of the final composition (e.g., slab, tablet, stick, etc.), and the strength desired. In general, the water soluble flavoring agents are within the range of about 0.05% to about 20% by weight of the total composition with about 0.05% to about 5% by weight being preferred, about 0.5% to about 3% by weight being more preferred and about 1.5% to about 3% being most preferred. In general, the oil soluble flavoring agents are within the range of about 0.05% to about 5% by weight of the total composition with about 0.05% to about 2.0% by weight being preferred and about 0.05% to about 1.5% by weight being most preferred.

Water soluble, as used herein, means that the solubility of the flavoring agent in water is from slightly soluble to completely soluble. Preferably the water soluble flavoring agent is one that is moderately soluble to completely soluble in water and most preferably is one that is very soluble to completely soluble and even more preferably is one that is completely soluble. In general, the water soluble flavoring agents utilizable are those from which at least a 5% by weight solution can be made. Oil soluble, as used herein, means the solubility of the oil soluble flavoring agent in water is from very slightly soluble to insoluble. In general, when an oil soluble flavoring agent is mixed with water two phases are formed, an oil phase and a water phase, with substantially all of the oil soluble flavoring agent being in the oil phase.

Flavoring agents (flavors) well known to those skilled in the art can be used. These favoring agents may be chosen from synthetic flavor oils and flavoring aromatics, and/or oils, oleo resins and extracts derived from plants, leaves, flowers, fruits and so forth, and combinations thereof. These flavoring agents are generally liquids but can also be used as spray dried solids, powdered solids and the like.

Representative oil soluble flavoring agents include: spearmint oil, cinnamon oil, oil of wintergreen (methylsalicylate), peppermint oils, clove oil, bay oil, anise oil, eucalyptus oil, thyme oil, cedar leaf oil, oil of nutmeg, oil of sage, oil of bitter almonds, peanut butter flavor, chocolate flavor, rum flavor, cassia oil, cinnamon mint flavor, corn mint oil, cardamom flavor, ginger flavor, cola flavor, cherry cola flavor, and the like.

Representative water soluble flavoring agents include: artificial, natural or synthetic fruit flavors, such as vanilla, and citrus essences, including lemon, orange, grape, lime and grapefruit and fruit essences including apple, pear, peach, strawberry, raspberry, cherry, plum, cranberry, pineapple, apricot, black currant, mixed fruit (e.g. tutti frutti) and various plant parts and extracts of plant parts such as carob, coffee, licorice and so forth.

Flavoring agents such as aldehydes and esters including cinnamyl acetate, cinnamaldehyde, citral diethylacetal, dihydrocarvyl acetate, eugenyl formate, p-methylanisole, and so forth may also be used for their appropriate solubilities. Generally any flavoring or food additives such as those described in *Chemicals Used in Food Processing*, pub 1274 by the National Academy of Sciences, pages 63-258 may be used for their appropriate solubilities.

The flavoring agents along with gum base, as well as a variety of other traditional or conventional chewing gum additives known to those skilled in the art, can be combined to produce any suitable chewing gum composition having sequential flavor release. The chewing gum compositions produced can have known conventional moisture levels (e.g., about 2% to about 8% by weight of the total composition). Although not required nor critical, it is preferred that the chewing gum compositions have a relatively low moisture content, e.g. from about 0.5 to about 3% by weight of the total chewing gum composition and preferably about 0.5 to about 2% by weight. Suitable chewing gum compositions are described in U.S. Pat. Nos. 4,514,422 to Yang et al., issued Apr. 30, 1985; 4,579,738 to Cherukuri et al., issued Apr. 1, 1986; 4,581,234 to Cherukuri et al., issued Apr. 8, 1986; and 4,587,125 to Cherukuri et al., issued May 6, 1986 the disclosures of each being incorporated herein by reference thereto.

The amount of gum base employed will vary greatly depending on various factors such as the type of base used, consistency desired and other components used to make the final product. In general, amounts of about 5% to about 45% by weight of the final chewing gum composition (i.e., by weight of the total composition) are acceptable for use in chewing gum compositions with preferred amounts of about 15% to abut 30% by weight and most preferred amounts of about 15% to about 25% by weight. The gum base used in this invention may be any water-insoluble gum base well known in the art. Illustrative examples of suitable polymers in gum bases include both natural and synthetic elastomers and rubbers. For example, those polymers which are suitable in gum bases include, without limitation, substances of vegetable origin such as chicle, jelutong, gutta percha and crown gum. Synthetic elastomers such as butadiene-styrene copolymers, isobutylene-isoprene copolymers, polyethylene, polyisobutylene, polyvinylacetate and mixtures thereof, are particularly useful.

The gum base compositions may contain conventional elastomer solvents to aid in softening the rubber component. Such elastomer solvents may comprise methyl, glycerol or pentaerythritol esters of rosins or modified rosins, such as hydrogenated, dimerized or polymerized rosins or mixtures thereof. Examples of elastomer solvents suitable for use herein include pentaerythritol ester of partially hydrogenated wood or gum rosin, pentaerythritol ester of wood or gum rosin, glycerol ester of partially dimerized rosin, glycerol ester of polymerized rosin, glycerol ester of tall oil rosin, glycerol ester of wood or gum rosin and partially hydrogenated wood or gum rosin, and partially hydrogenated methyl ester of rosin and mixtures thereof. The elastomer solvent may be employed in an amount ranging from about 10% to about 75% and preferably about 45% to about 70% by weight of the gum base.

A variety of traditional ingredients used as plasticizers or softeners such as lanolin, stearic acid, sodium stearate, potassium stearate, glyceryl triacetate, glycerin, lecithin, and glyceryl monostearate and the like, may also be incorporated into the gum base to obtain a variety of desirable textures and consistency properties. These additional materials are generally employed in amounts of up to about 30% by weight and preferably in amounts of from about 3% to about 5% by weight of the final gum base composition.

The chewing gum compositions employing the instant gum bases generally contain sweetening agents (sweeteners). The sweetening agent may be selected from a wide range of materials including water-soluble sweetening agents, water-soluble artificial sweeteners, water-soluble sweetening agents derived from naturally occurring water-soluble sweeteners, dipeptide based sweeteners, and protein based sweeteners, including mixtures thereof. Without being limited to particular sweeteners, representative illustrations encompass:

A. Water-soluble sweetening agents such as monosaccharides, disaccharides and polysaccharides such as xylose, ribose, glucose (dextrose), mannose, galactose, fructose (levulose), sucrose (sugar), maltose invert sugar (a mixture of fructose and glucose derived from sucrose), partially hydrolyzed starch, corn syrup solids, dihydrochalcones, monellin, steviosides, glycyrrhizin, and sugar alcohols such as sorbitol, xylitol, mannitol, maltitol, hydrogenated starch hydrolysate and mixtures thereof;

B. Water-soluble artificial sweeteners such as the soluble saccharin salts, i.e., sodium or calcium saccharin salts, cyclamate salts, acesulfame-K and the like, and the free acid form of saccharin;

C. Dipeptide based sweeteners such as L-aspartyl-L-phenylalanine methyl ester and materials described in U.S. Pat. No. 3,492,131 L-$\alpha$-aspartyl-N-(2,2,4,4-tetramethyl-3-thietanyl)-D-alaninamide hydrate, and the like;

D. Water-soluble sweeteners derived from naturally occurring water-soluble sweeteners, such as a chlorinated derivative of ordinary sugar (sucrose), known, for example, under the product designation of sucralose; and E. Protein based sweeteners such as thaumatin.

In general, the amount of sweetener will vary with the sweetener selected for a particular chewing gum composition. Thus, for any given sweetener a sufficient amount of sweetener is used to provide the end result desired. For example, an effective amount of sweetener is utilized to provide the level of sweetness desired. This amount will normally be 0.01% to about 90% by weight when using an easily extractable sweetener. The water-soluble sweeteners described in category A above, are usually used in amounts of about 25% to about 75% by weight, and preferably in amounts of about 50% to about 65% by weight of the final chewing gum composition. Some of the sweeteners in category A (e.g., glycyrrhizin) may be used in amounts set forth for categories B-E below due to the sweeteners known sweetening ability. In contrast, the sweeteners described in categories B-E are used in amounts of about 0.005% to about 5.0% and most preferably about 0.05% to about 2.5% by weight of the final chewing gum composition. These amounts are ordinarily necessary to achieve a desired level of sweetness independent from the flavor level achieved from flavor oils.

The chewing gum compositions of this invention may additionally include effective amounts of the conventional additives of coloring agents such as titanium dioxide; emulsifiers such as lecithin and glyceryl monostearate; maltodextrins; and fillers such as aluminum hydroxide, alumina, aluminum silicates, talc, dicalcium phosphate, calcium carbonate, and combinations thereof. Preferably the amount of fillers used is up to about 25% by weight of the gum base.

The chewing gum compositions of this invention, as stated above, may contain effective amounts of a maltodextrin or a modified maltodextrin. Modified maltodextrins are known in the art and have low bulk densities in comparison to conventional maltodextrins. For example, a modified maltodextrin can have a bulk density in the range of about 3.0 to 8 lbs/ft.$^3$ and preferably about 3.0 to about 6.0 lb/ft.$^3$. Preferably the amount of such maltodextrins used is about 2% to about 8% by weight of the total composition and more preferably about 3% to about 5% by weight. Preferably modified maltodextrin is used. Such maltodextrins are used to enhance the overall perception of the claimed chewing gum compositions in the mouth of the chewer. Since the maltodextrins are not combined with any flavoring agent prior to mixing either the flavoring agent or the maltodextrins into the chewing gum compositions, the use of the maltodextrins is unrelated to the sequential release of flavoring agents. This is also obvious in view of the water solubility of these maltodextrins. Since the maltodextrins are water soluble they would dissolve out of the chewing gum composition at substantially the same time as the water soluble flavoring agents. Thus, if any amount of flavoring agents did become absorbed onto the maltodextrins during mixing of the chewing gum composition, such a combination would not contribute to the sequential release of the flavoring agents.

The chewing gum compositions of this invention may be produced by techniques well known to those skilled in the art. For example, using conventional equipment the gum base is heated to temperatures sufficiently high enough to soften the base without adversely effecting the physical and chemical make up of the base. The optimum temperatures utilized may vary depending on the composition of the gum base used, but such temperatures are readily determined by those skilled in the art without undue experimentation. For example, suitable temperature for softening the gum base are within the range of about 70° C. to about 90° C. Temperatures within the range of about 40° C. to about 60° C. may be used when the gum base used is amongst those disclosed in, for example U.S. Pat. No. 4,587,125. During heating, the gum base is mixed with any of the optional components traditionally used with the gum base, such as plasticizers and elastomer solvents. In general, the order of addition of the various components (ingredients) of the chewing gum composition is not critical. The flavoring agents, however, should be added when the gum base has been allowed to cool to a temperature below the volatilization temperature of the flavoring agents used. The flavors may be added separately or blended together as a preblend before their addition. The mixture so produced is then extruded, using conventional equipment, and formed into suitable chewing gum shapes.

Those skilled in the art will appreciate that the total amount of all ingrediets (components) used in the chewing gum compositions of this invention equals 100% by weight of the total composition. Also, unless states otherwise, all percents herein are percent by weight of the total composition.

The following examples are illustrative only and should not be construed as limiting the invention in any way. Those skilled in the art will appreciate that variations are possible which are within the spirit and scope of the appended claims.

TABLE I

Chewing Gums Having Sequentially Releasable Flavors

| Ingredient | Examples | | | |
|---|---|---|---|---|
| | 1 | 2 | 3 | 4 |
| Gum Base | 24.00 | 24.00 | 24.00 | 24.00 |
| Sugar (sucrose) | 65.40 | 64.50 | 65.45 | 65.20 |
| Maltodextrin | 4.00 | 4.00 | 4.00 | 4.00 |
| Glycerin | 4.00 | 4.00 | 4.00 | 4.00 |
| Lecithin | 0.50 | 0.50 | 0.50 | 0.50 |
| Coffee WONF* | 2.00 | 2.00 | 2.00 | 2.00 |
| Chocolate flavor** | — | 1.00 | — | — |
| Peppermint flavor** | — | — | 0.05 | — |
| Rum flavor** | — | — | — | 0.30 |
| Cinnamon flavor** | 0.10 | — | — | — |

*Water soluble, WONF means "With Other Natural Flavors"
**Oil soluble

The gum base was melted at a temperature of about 70° C. to about 90° C. The melted gum base and the lecithin were added to a mixing kettle and mixed for about 2 minutes. Next the maltodextrin and about ½ the amount of sugar was added and mixed for about one minute. The flavoring agents were then added as a preblend and mixed for about 3 minutes. Following this the glycerin was added and mixed for about 3½ minutes. The remaining sugar was then added and mixed for about 5 minutes. When chewed the coffee-cinnamon (Example 1), the coffee-chocolate (Example 2), the coffee-mint (Example 3) and the coffee-rum (Example 4) flavored chewing gum compositions all exhibited sequential flavor release. The first flavor released from each composition was coffee (water soluble) which was followed about 30 to about 45 seconds later by the release of the oil soluble flavoring agents.

The invention being thus described, it will be obvious that the same may be varied in many ways. Such variations are not to be regarded as a departure from the spirit and scope of the invention and all such modifications are intended to be included within the scope of the claims.

What is claimed is:

1. A sequentially flavored chewing gum composition comprising:
   (A) gum base in an amount sufficient to form a chewing gum composition;
   (B) one or more non-confined water soluble flavoring agents in an amount sufficient to give the flavor perception of said water soluble flavoring agents, said water soluble flavoring agents having the same or different solubilities and the same or different rates of release;
   (C) one or more non-confined oil soluble flavoring agents in an amount sufficient to give the flavor perception of said oil soluble flavoring agents, said oil soluble flavoring agents having the same or different solubilities and the same or different rates of release;
   (D) optionally, effective amounts of conventional chewing gum additives; and
   (E) an effective amount of a sweetening agent; wherein
   said water soluble flavoring agents, upon chewing said composition, release first to provide distinct flavor perceptions, and said oil soluble flavoring agents release subsequent to the release of said water soluble flavoring agents to provide flavor perceptions distinct from said water soluble flavoring agents' flavor perceptions.

2. The composition of claim 1 wherein said gum base is comprised of polymers selected from the group consisting of chicle, jelutong, gutta percha, crown gum, butadiene-styrene copolymers, isobutylene-isoprene copolymers, polyethylene, polyisobutylene, polyvinylacetate, and mixtures thereof.

3. The composition of claim 1 wherein said gum base is present in amounts of about 5% to about 45% by weight of the total composition.

4. The composition of claim 1 wherein said water soluble flavoring agent is selected from the group consisting of vanilla, lemon, orange, grape, lime, grapefruit, apple, pear, peach, strawberry, raspberry, cherry, plum, pineapple, apricot, coffee, cranberry, black currant, licorice, carob, mixed fruit, and mixtures thereof.

5. The composition of claim 1 wherein said oil soluble flavoring agents are selected from the group consisting of spearmint, cinnamon, wintergreen, peppermint, clove, bay, anise, eucalyptus, thyme, nutmeg, sage, bitter almonds, cinnamon mint, corn mint, cardamom, ginger, cola, rum, peanut butter and chocolate flavors, and mixtures thereof.

6. The composition of claim 1 wherein said water soluble flavoring agent is coffee.

7. The composition of claim 1 wherein said oil soluble flavoring agents are selected from the group consisting of cinnamon, chocolate, peppermint, spearmint, rum flavors, and mixtures thereof.

8. The composition of claim 1 wherein said water soluble flavoring agents and said oil soluble flavoring agents are each present in amounts within the range about 0.05% to about 5% by weight of the composition.

9. The composition of claim 8 wherein said water soluble flavoring agents are present in amounts within the range of about 0.5% to about 3.0% by weight of the total composition and said oil soluble flavoring agents are present in amounts within the range of about 0.05% to about 2.0% by weight of the total composition.

10. The composition of claim 1 wherein said sweetening agent is selected from the group consisting of water-soluble sweeteners, water-soluble artificial sweeteners, water-soluble sweeteners derived from naturally occurring water-soluble sweeteners, dipeptide based sweeteners, protein based sweeteners and mixtures thereof.

11. The composition of claim 10 wherein said water-soluble sweeteners are selected from the group consisting of sucrose, fructose, glucose, sorbitol, xylitol, mannitol, corn syrup solids and mixtures thereof; wherein said water-soluble sweetener derived from naturally occurring water-soluble sweeteners are selected from the group consisting of soluble saccharin salts, acesulfame-K, and mixtures thereof; wherein said water-soluble sweeteners is a chlorinated derivative of sucrose; wherein said dipeptide based sweeteners are selected from the group consisting of L-aspartyl-L-phenylalanine methyl ester, L-α-aspartyl-N-(2,2,4,4,-tetramethyl-3-thietanyl)-D-alaninamide hydrate, and mixtures thereof; and wherein said protein based sweetener is thaumatin.

12. The composition of claim 1 further comprising a maltodextrin in an amount of about 2% to about 8% by weight of the total composition.

13. The composition of claim 1 wherein said water soluble flavoring agents are present within the range of about 0.05% to about 20% by weight of the total composition.

14. A sequentially flavored chewing gum composition comprising:
(A) from about 5% to about 45% by weight of the total composition of gum base;
(B) from about 0.05% to about 20% by weight of the total composition of one or more non-confined water soluble flavoring agents having the same or different solubilities and the same or different rates of release;
(C) from about 0.05% to about 5% by weight of the total composition of one or more non-confined oil soluble flavoring agents having the same or different solubilities and the same or different rates of release;
(D) from about 0.01% to about 90% by weight of the total composition of a sweetening agent; and
(E) optionally, effective amounts conventional chewing gum additives; wherein
said (A)–(E) totals 100%; and wherein
said water soluble flavoring agents, upon chewing said composition, release first to provide distinct flavor perceptions, and said oil soluble flavoring agents release subsequent to the release of said water soluble flavoring agents to provide flavor perceptions distinct from said water soluble flavoring agents' flavor perceptions.

15. The composition of claim 14 wherein one water soluble flavoring agent is used and one oil soluble flavoring agent is used.

16. The composition of claim 14 wherein said water soluble flavoring agents are selected from the group consisting of vanilla, lemon, orange, grape, lime, grapefruit, apple, pear, peach, strawberry, raspberry, cherry, plum, pineapple, apricot, coffee, cranberry, black currant, licorice, carob, mixed fruit, and mixtures thereof; wherein said oil soluble flavoring agents are selected from the group consisting of spearmint, cinnamon, wintergreen, peppermint, clove, bay, anise, eucalyptus, thyme, nutmeg, sage, bitter almonds, cinnamon mint, corn mint, cardamom, ginger, cola, rum, peanut butter and chocolate flavors, and mixtures thereof; wherein said sweetening agent is selected from the group consisting of water-soluble sweeteners, water-soluble artificial sweeteners, water-soluble sweeteners derived from naturally occurring water-soluble sweeteners, dipeptide based sweeteners, protein based sweeteners and mixtures thereof; and wherein said gum base is comprised of polymers selected from the group consisting of chicle, jelutong, gutta percha, crown gum, butadiene-styrene copolymers, isobutylene-isoprene copolymers, polyethylene, polyisobutylene, polyvinylacetate, and mixtures thereof.

17. The composition of claim 16 wherein said water soluble flavoring agent is coffee; wherein said oil soluble flavoring agent is selected from the group consisting of cinnamon, chocolate, peppermint, spearmint, and rum flavors, and mixtures thereof; wherein said water-soluble sweeteners are selected from the group consisting of sucrose, fructose, glucose, corn syrup solids, sorbitol, xylitol, mannitol, and mixtures thereof; wherein said watersoluble artificial sweeteners are selected from the group consisting of soluble saccharin salts, acesulfame-K, and mixtures thereof; wherein said water soluble sweetener derived from naturally occurring water-soluble sweeteners is a chlorinated derivative of sucrose; wherein said dipeptide based sweeteners are selected from the group consisting of L-aspartyl-L-phenylalanine methyl ester, L-α-aspartyl-N-(2,2,4,4,-tetra-methyl-3-thietanyl)-D-alaninamide hydrate, and mixtures thereof; and wherein said protein based sweetener is thaumatin.

18. The composition of claim 17 further comprising a maltodextrin in an amount of about 2% to about 8% by weight of the total composition wherein the percentage of the components (A)–(E) and the maltodextrin equals 100%.

19. The composition of claim 14 wherein said water soluble flavoring agents are present within the range of about 0.05% to about 5.0% by weight of the total composition.

20. A process for making a chewing gum composition comprising:
   mixing a gum base in an amount sufficient to form a chewing gum composition; with
   one or more non-confined water soluble flavoring agents in an amount sufficient to give the flavor perception of said water soluble flavoring agents, said water soluble flavoring agents having the same or different solubilities and the same or different rates of release; with
   one or more non-confined oil soluble flavoring agents in an amount sufficient to give the flavor perception of said oil soluble flavoring agents, said oil soluble flavoring agents having the same or different solubilities and the same or different rates of release; with
   an effective amount of a sweetening agent; with, optionally,
   effective amounts of conventional chewing gum additives; wherein
   said gum base and said flavoring agents are mixed together at a temperature below the volatilization temperature of said flavoring agents, thereby forming a chewing gum composition having sequentially releasable flavoring agents wherein said water soluble flavoring agents, upon chewing said composition, release first to provide distinct flavor perceptions, and said oil soluble flavoring agents release subsequent to the release of said water soluble flavoring agents to provide flavor perceptions distinct from said water soluble flavoring agents' flavor perceptions.

21. The process of claim 20 wherein one water soluble flavoring agent is utilized and one oil soluble flavoring agent is utilized.

22. The process of claim 20 wherein said gum base is used in amounts of about 5% to about 45% by weight of the total composition; and wherein said water soluble flavoring agents are used in amounts within the range of about 0.05% to about 20% by weight of the total composition, and said oil soluble flavoring agents are used in amounts within the range of about 0.05% to about 5% by weight of the composition.

23. A sequentially flavored chewing gum composition comprising:
   (A) gum base in an amount sufficient to form a chewing gum composition;
   (B) effective amounts of two or more non-confined oil soluble flavoring agents wherein at least two flavoring agents have different solubilities and different rates of release;
   (C) an effective amount of a sweetening agent; and
   (D) optionally, effective amounts of conventional chewing gum additives; wherein
   said flavoring agents release sequentially to provide distinct flavor perceptions.

24. The composition of claim 23 wherein said sweetening agent is selected from the group consisting of water-soluble sweeteners, water-soluble artificial sweeteners, water-soluble sweeteners derived from naturally occurring water-soluble sweeteners, dipeptide based sweeteners, protein based sweeteners and mixtures thereof.

25. A process for making a chewing gum composition comprising:
   mixing a gum base in an amount sufficient to form a chewing gum composition, with
   effective amounts of two or more non-confined oil soluble flavoring agents wherein at least two flavoring agents have different solubilities and different rates of release, with
   an effective amount of a sweetening agent, with
   optionally, effective amounts of conventional chewing gum additives; wherein
   said gum base and flavoring agents are mixed together at a temperature below the volatilization temperature of said flavoring agents, thereby forming a chewing gum composition having sequentially releasable flavoring agents providing distinct flavor perceptions.

* * * * *

UNITED STATES PATENT AND TRADEMARK OFFICE
CERTIFICATE OF CORRECTION

PATENT NO. : 4,775,537
DATED : October 4, 1988
INVENTOR(S) : F. Calabro, et. al.

It is certified that error appears in the above-identified patent and that said Letters Patent is hereby corrected as shown below:

Claim 8, Column 11, Line 26: Insert "of" before "about 0.05%"
Claim 11, Column 11: Delete lines 44-48, and Insert:

"...said water-soluble artificial sweeteners are selected from the group consisting of soluble saccharin salts, acesulfame-K, and mixtures thereof; wherein said water-soluble sweetener derived from naturally occurring water-soluble sweeteners is a chlorinated derivative of sucrose;..

Signed and Sealed this

Seventh Day of March, 1989

*Attest:*

DONALD J. QUIGG

*Attesting Officer*  *Commissioner of Patents and Trademarks*